United States Patent
Lacan et al.

(10) Patent No.: US 8,679,637 B2
(45) Date of Patent: Mar. 25, 2014

(54) ELECTROSTATIC FILM COATED OPHTHALMIC LENS AND METHOD FOR EDGING SAME

(75) Inventors: Pascale Lacan, Paris (FR); Dominique Conte, Saint-Dizier (FR)

(73) Assignee: Essilor International Compagnie Generale d'Optique, Charenton (FR)

( * ) Notice: Subject to any disclaimer, the term of this patent is extended or adjusted under 35 U.S.C. 154(b) by 647 days.

(21) Appl. No.: 10/573,692

(22) PCT Filed: Sep. 24, 2004

(86) PCT No.: PCT/FR2004/002426
§ 371 (c)(1),
(2), (4) Date: Mar. 27, 2006

(87) PCT Pub. No.: WO2005/031441
PCT Pub. Date: Apr. 7, 2005

(65) Prior Publication Data
US 2008/0117382 A1      May 22, 2008

(30) Foreign Application Priority Data

Sep. 26, 2003 (FR) .................................. 03 11351
Jan. 14, 2004 (FR) .................................. 04 50082

(51) Int. Cl.
B32B 27/00       (2006.01)

(52) U.S. Cl.
USPC ............................ 428/500; 428/412; 428/522

(58) Field of Classification Search
USPC .......................................... 428/500, 412, 522
See application file for complete search history.

(56) References Cited

U.S. PATENT DOCUMENTS

| 2,392,768 A | 1/1946 | Ryan ................................. 117/6 |
| 2,536,075 A | 1/1951 | MacNutt ......................... 134/28 |
| 4,085,248 A | 4/1978 | Zehender et al. ............. 428/336 |
| 4,387,960 A | 6/1983 | Tani ................................ 359/588 |
| 4,410,563 A | 10/1983 | Richter et al. ................. 422/108 |
| 4,826,548 A | 5/1989 | Herbin et al. .................. 156/152 |
| 4,959,118 A | 9/1990 | Herbin et al. .................. 156/512 |
| 5,211,759 A | 5/1993 | Zimmermann et al. ....... 118/723 |
| 5,328,768 A | 7/1994 | Goodwin ...................... 428/428 |
| 5,451,281 A * | 9/1995 | Lipman ......................... 156/154 |
| 5,582,907 A | 12/1996 | Pall ................................ 442/351 |
| 5,680,013 A | 10/1997 | Dornfest et al. ........... 315/111.21 |
| 5,792,537 A * | 8/1998 | Ohlin, Jr. ....................... 428/45 |
| 5,800,918 A | 9/1998 | Chartier et al. ............... 428/336 |

(Continued)

FOREIGN PATENT DOCUMENTS

| EP | 0 203 730 | 12/1986 |
| EP | 0614957 | 3/1994 |

(Continued)

OTHER PUBLICATIONS

Database WPI, Section CH, Week 198819, Derwent Publications Ltd., London, GB, XP002214922, 1987.

(Continued)

*Primary Examiner* — Elizabeth A Robinson
(74) *Attorney, Agent, or Firm* — Fulbright & Jaworski LLP

(57) ABSTRACT

The optical lens according to the invention comprises a temporary protective coating comprising at least one outer layer, which is mechanically alterable through friction or contact, said layer being coated with a peelable film which electrostatically adheres to the outer layer.

25 Claims, 1 Drawing Sheet

(56) References Cited

U.S. PATENT DOCUMENTS

| | | | |
|---|---|---|---|
| 5,827,614 A * | 10/1998 | Bhalakia et al. | 428/411.1 |
| 5,883,169 A * | 3/1999 | Spector et al. | 524/292 |
| 5,888,615 A * | 3/1999 | Mascarenhas et al. | 428/141 |
| 5,919,563 A | 7/1999 | Parish, Jr. et al. | 428/343 |
| 6,143,143 A | 11/2000 | Walls et al. | 204/192.26 |
| 6,143,358 A | 11/2000 | Singh et al. | 427/162 |
| 6,149,750 A | 11/2000 | Parish, Jr. et al. | 156/154 |
| 6,277,485 B1 | 8/2001 | Invie et al. | 428/336 |
| 6,364,823 B1 | 4/2002 | Garibaldi et al. | 600/12 |
| 6,413,413 B1 | 7/2002 | Smith, Jr. | 208/213 |
| 6,682,773 B2 | 1/2004 | Medwick et al. | 427/154 |
| 6,863,965 B2 | 3/2005 | Fujinawa et al. | 428/215 |
| 6,884,432 B2 | 4/2005 | Yaszemski et al. | 424/460 |
| 2003/0049370 A1 | 3/2003 | Lacan et al. | 427/165 |
| 2003/0059623 A1 | 3/2003 | O'Shaughnessy et al. | 428/428 |
| 2004/0087680 A1* | 5/2004 | Hage | 523/160 |
| 2005/0115923 A1 | 6/2005 | Lacan et al. | 216/26 |
| 2005/0126687 A1* | 6/2005 | Niejelow et al. | 156/154 |
| 2006/0246278 A1 | 11/2006 | Lacan et al. | 428/336 |
| 2007/0141358 A1 | 6/2007 | Jallouli et al. | 428/426 |
| 2007/0183056 A1 | 8/2007 | Conte et al. | 359/642 |

FOREIGN PATENT DOCUMENTS

| | | |
|---|---|---|
| EP | 0 749 021 | 12/1996 |
| EP | 0 844 265 | 5/1998 |
| EP | 0 933 377 | 8/1999 |
| FR | 2613275 | 3/1987 |
| FR | 2824821 | 5/2001 |
| JP | 60135167 | 7/1985 |
| JP | 06-230319 | 8/1994 |
| JP | 2004-122238 | 4/2004 |
| JP | 2004-148444 | 5/2004 |
| WO | WO 97/10923 | 3/1997 |
| WO | WO 00/68326 | 11/2000 |
| WO | WO 01/02496 | 1/2001 |
| WO | WO 02/092524 | 11/2002 |
| WO | WO 03/006704 | 1/2003 |
| WO | WO 03/057641 | 7/2003 |
| WO | WO 03057641 A1 * | 7/2003 |
| WO | WO 2005/012955 | 2/2005 |
| WO | WO 2005/015270 | 2/2005 |
| WO | WO 2006/092002 | 9/2006 |

OTHER PUBLICATIONS

Gutowski, "The relationship between strength adhesive bond and the thermodynamic properties of its components," *Int. J. Adhesion and Adhesives*, 7:189-198, 1987.

March, *Advanced Organic Chemistry*, $4^{th}$ ed., John Wiley & Sons, publishers, 1992.

Sobieski and Tangney., *Handbook of Pressure-Sensitive Adhesive Technology*, $2^{nd}$ Ed., D. Satas, ed., Van Nostrand Reinhold, New York, pp. 508-517, 1989.

Owens and Wendt, "Estimation of the Surface Free Energy of Polymers," *J. Appl. Polymer Sci.*, 13:1741-1747, 1969.

Office Communication, issued in Japanese Patent Application No. 2006-527449, dated Feb. 1, 2011.

\* cited by examiner

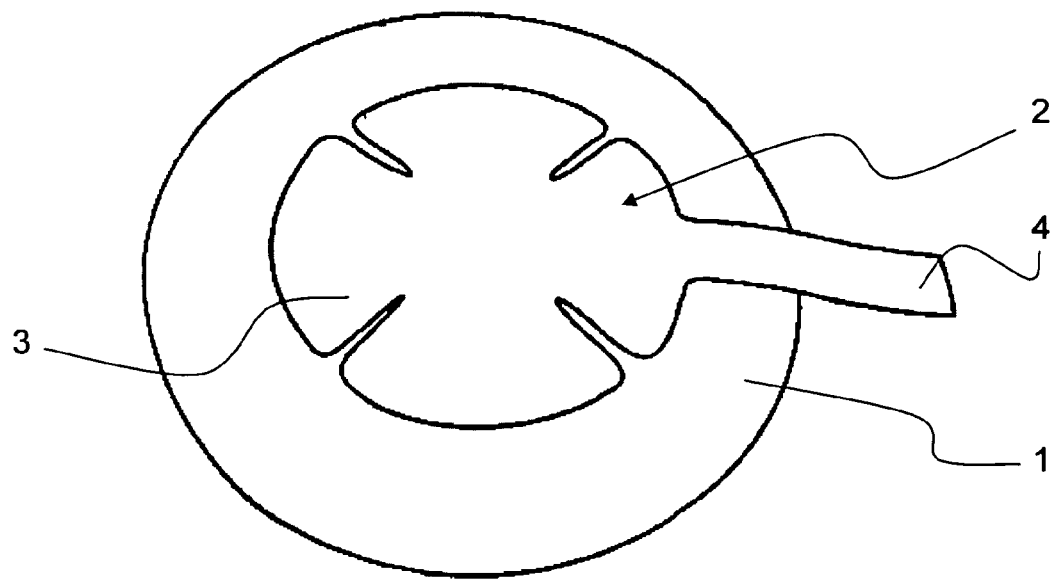

ELECTROSTATIC FILM COATED OPHTHALMIC LENS AND METHOD FOR EDGING SAME

This application is a national phase application under 35 U.S.C. §371 of International Application No. PCT/FR2004/002426 filed 24 Sep. 2004, which claims priority to French Application No. 03/11351 filed 26 Sep. 2003 and French Application No. 04/50082 filed 14 Jan. 2004. The entire text of each of the above-referenced disclosures is specifically incorporated herein by reference without disclaimer.

This invention generally relates to an optical lens, more particularly an ophthalmic lens, having a main face comprising a protective temporary coating, being in turn coated with a peelable electrostatic film.

An optical lens, more particularly an ophthalmic lens, results from a sequence of moulding and/or surfacing/smoothing steps determining the geometry of both convex and concave optical surfaces of the lens, followed by appropriate surface treatments.

The last finishing step of an ophthalmic lens is the edging operation consisting in machining out the edge or the periphery of the glass so as to shape it according to the required dimensions to adapt the lens to the glass frame wherein it is to be arranged.

Edging is generally done on a grinding machine comprising diamond wheels that perform the machining step as defined hereinabove.

The lens is held, upon such an operation, by axially acting blocking members.

The relative motion of the lens with respect to the grinding wheel is monitored, generally digitally, so as to provide the desired shape.

As it appears, it is mostly imperative that the lens be firmly maintained upon such a movement.

To this end, before the edging operation, a lens-blocking step is performed, i.e. a holding means or chuck is positioned on the convex surface of the lens.

A holding pad, such a self-adhesive chip, for example a two-sided adhesive, is arranged between the chuck and the convex surface of the lens.

The so arranged lens is positioned on one of the above-mentioned axial blocking members, the second axial blocking member clamping then the lens on the concave surface thereof by means of an abutment, generally made of an elastomer.

Upon the machining step, a tangential torque stress is generated on the lens, which may result in a rotation of the lens relative to the chuck if the lens holding means is not sufficiently efficient.

The good holding of the lens mainly depends on the good adhesion at the holding pad/convex surface interface of the lens.

The last generation ophthalmic lenses most often comprise an organic or mineral outer layer modifying the surface energy, for example anti-fouling hydrophobic and/or oleophobic coatings.

These are most often materials of the fluorosilane type reducing the surface energy so as to avoid the adhesion of fatty stains, which are thus easier to be removed.

Such a surface coating type may be so efficient that the adhesion at the pad/convex surface interface may be thereby altered, making difficult satisfactory edging operations, in particular for polycarbonate lenses the edging of which generates much larger efforts in comparison with other materials.

The consequence of a badly performed edging operation is the pure and simple loss of the lens.

That is why it is advantageous to deposit on the outer layer a temporary protective layer, imparting a surface energy at least equal to 15 mJ/m$^2$, in particular a fluoride, oxide, metal hydroxide layer, and preferably, a MgF$_2$ protective layer, such as disclosed in the French Patent Application no 0106534, as well as a marking ink or a resin being the binder of such marking inks.

Optical lenses, more particularly, ophthalmic ones, comprising optionally one or more conventional functional coatings, such as a primer coating improving the adhesion of other functional layers, an anti-abrasion coating and a anti-reflection coating, and comprising a hydrophobic and/or oleophobic surface coating, more particularly an anti-fouling one, in turn being at least partially coated with a protective temporary coating, more specially, improving the edging operation, are each stored and delivered in paper bags innerly provided with a protective coating. The bags each containing a lens may be stacked onto one another during storage or shipping.

It has been found that, due to frictions or even simple pressures, during storage or handling of such lenses, including in their respective bags, the protective temporary coating was being altered, in particular in coatings comprising an outer metal fluoride layer and more specially a MgF$_2$ protective layer, that could lead to a loss of adhesion with the holding pad during the edging operation. Such an alteration can be observed visually, more specially in the case of a MgF$_2$ outer layer, through the occurrence on the temporary protective outer layer of marks which are visible to the naked eye.

U.S. Pat. No. 5,792,537 discloses the protection of erasable marks being printed on the surface of an optical lens during the grinding operation of such a lens by masking the marks using an adhesive tape. The adhesive tape could be an electrostatic film such as a highly plasticized vinyl film.

An object of the present invention is therefore to provide an optical lens, more particularly an ophthalmic one, comprising an outer protective coating capable to be mechanically altered through friction and/or contact, which is protected from such an alteration, more particularly when the lens is being stored and/or handled.

According to the invention, the optical lens comprises a temporary outer protective coating covering at least partially the lens and comprising at least one outer layer able to be mechanically altered through friction and/or contact, except for an outer metal oxide and/or metal hydroxide layer being directly in contact with an underlying layer containing magnesium fluoride and is wherein the outer layer of the temporary outer protective coating is coated with a peelable film electrostatically adhering to the outer layer.

According to a preferred embodiment of the invention, the outer layer is made of a material chosen from metal fluorides and mixtures thereof, metal oxides and mixtures thereof, metal hydroxides and mixtures thereof, mixtures of two or more of such metal fluorides, oxides and hydroxides, marking inks for optical lenses and resins chosen from resins which may form the binding agent of such marking inks.

More preferably, the outer layer of the temporary outer protective coating consists of a metal fluoride, a metal oxide or a metal hydroxide.

Herein, the term "lens" means an organic or mineral glass lens, either treated or not, depending whether it comprises one or more coatings of various natures or whether it is naked.

When the lens comprises one or more surface coatings, the term "to deposit a layer onto the lens" means that a layer is deposited onto the lens outer coating.

The surface energies are calculated according to the Owens-Wendt method as described in the following reference: "Estimation of the surface force energy of polymers", Owens D. K., Wendt R. G. (1969) J. APPL. POLYM. SCI, 13, 1741-1747.

The optical lenses according to the invention generally comprise a hydrophobic and/or an oleophobic surface coating and preferably comprise both a hydrophobic and/or an oleophobic surface coating deposited on an anti-reflection mono- or multilayer coating.

Indeed, hydrophobic and/or oleophobic coatings are generally applied onto lenses comprising a anti-reflection coating, in particular made of a mineral material, so as to reduce their strong tendency to staining, for example towards greasy deposits.

As previously indicated, hydrophobic and/or oleophobic coatings are obtained through the application, generally on the surface of the anti-reflection coating, of compounds reducing the surface energy of the lens.

Such compounds have been extensively disclosed in the prior art, for example, in the following patents U.S. Pat. No. 4,410,563, EP-0203730, EP-749021, EP-844265, EP-933377.

Silane-based compounds bearing fluorinated groups, more particularly perfluorocarbon or perfluoropolyether group(s) are most often used.

Examples may include silazane, polysilazane or silicon compounds comprising one or more fluorinated groups such as those previously mentioned.

A known method comprises depositing onto the anti-reflection coating compounds having fluorinated groups and Si—R groups, wherein R represents a —OH group or a precursor thereof, preferably an alkoxy. Such compounds are able to perform, at the anti-reflection coating surface, either directly or after hydrolysis, polymerization and/or cross-linking reactions.

Applying compounds for decreasing the surface energy of the glass conventionally occurs through quenching in a solution of said compound, through centrifugation or through vapour phase deposition, amongst others. Generally, the hydrophobic and/or oleophobic coating is less than 10 nm thick and preferably less than 5 nm thick.

The invention is preferably carried out with lenses comprising a hydrophobic and/or an oleophobic surface coating imparting a surface energy lower than 14 mJ/m$^2$ and more preferably equal to or lower than 12 mJ/m$^2$.

The temporary protective coating would generally increase the surface energy of the lens up to a value at least of 15 mJ/m$^2$.

It can be applied on an area covering the whole of at least one of the two sides of the lens or only on the area intended to be in contact with the holding pad of said lens.

More precisely, it is usual to deposit the holding pad, associated with the chuck, on the lens convex side. It is therefore possible to cover with the protective coating the whole convex side or, alternatively, only a central area of the convex side, using a mask or any other appropriate technique.

The deposit can equally cover the corresponding area, i.e. it has a continuous structure, but it can also have a discontinuous structure for example, having the shape of a frame.

In such a case, an irregular deposit is formed, with its surface remaining sufficient so as to provide the required adhesion of the holding pad.

The discontinuous structure deposits can be obtained through tampography.

However, the area covered by the temporary outer protective coating (according to the invention) should be such that the contact surface between the protective coating and holding pad would be sufficient to provide the adhesion of the lens to the pad.

Generally, the temporary protective coating covers at least 15%, preferably at least 20%, more preferably at least 30%, much more preferably at least 40%, and most preferably the whole surface of the lens on which the pad is to be adhered, i.e. generally the lens convex side.

As a result of depositing the temporary outer protective coating, a lens is obtained, being able to be edged.

This means that after the edging operation according to the method of the invention, the glass will have the required dimensions allowing to be suitably inserted into the glass frame wherein it is to be arranged.

More precisely, such a result is obtained when the lens, during the edging operation, is subjected to an offset of maximum 2°.

An optimal edging ability corresponds to a lens having an offset equal to or lower than 1°.

The temporary protective coating can be made of any material adapted to increase the surface energy of the lens with hydrophobic and/or oleophobic properties and being able to be removed during a subsequent operation following the edging step.

Of course, the material should be such as to avoid from definitely degrading the surface properties of the hydrophobic and/or oleophobic coating and such that, after its removal, the optical and surface properties of the lens are globally identical to those the lens had before the temporary protective coating was deposited.

Preferably, the temporary outer protective coating comprises an mineral outer layer, and more particularly, a fluoride or a blend of metal fluorides, an oxide or a blend of metal oxides or a metal hydroxide or a blend of metal hydroxides as well as a blend of such fluorides, oxides and hydroxides.

Examples of fluorides include magnesium fluoride $MgF_2$, lanthanum fluoride $LaF_3$, aluminium fluoride $AlF_3$ or cerium fluoride $CeF_3$.

Useful oxides are magnesium oxide (MgO), calcium oxide (CaO), titania ($TiO_2$), alumina ($Al_2O_3$), zirconia ($ZrO_2$), or praseodymium oxide ($Pr_2O_3$).

Mixtures of alumina and praseodymium oxide are suitable.

A particularly suitable material is PASO2 from Leybold Corporation.

Examples of metal hydroxides comprise $Mg(OH)_2$, $Ca(OH)_2$ and $Al(OH)_3$, preferably $Mg(OH)_2$.

The particularly preferred material is $MgF_2$.

The protective layer can be deposited using any suitable conventional method.

Generally, anti-reflection, hydrophobic and/or oleophobic coatings have been deposited by evaporation, in vacuum chambers and it is desirable to deposit the temporary protective layer with the same method, making it possible to perform all the operations successively, with no excessive handling of the lenses between the steps.

When it is made of a mineral material, the thickness of the protective coating is preferably lower than or equal to 50 nm, and generally ranges from 1 to 50 nm, and more preferably from 5 to 50 nm.

Generally, if the protective coating thickness is too low, there is the risk that the surface energy will be insufficiently modified.

If, on the contrary, the protective coating thickness is too high, more particularly for essentially mineral coatings, the inventors have found out that there is the risk that mechanical stresses could occur within the coating, which is detrimental to the expected properties.

Preferably, and more particularly when the protective coating is deposited on a whole side of the lens faces, the material has some degree of transparency allowing conventional power measurements to be performed on the lens measurements using a frontofocometer.

Thus, the lens according to the invention preferably has a transmission rate of at least 18%, preferably at least 40% according to the ISO8980/3 standard.

As an alternative to the above-mentioned mineral materials, one can use an ink which may be used for marking progressive ophthalmic glasses and/or a resin chosen from resins which may form the binding agent of an ink capable of being used for marking progressive ophthalmic glasses.

In such a case, it is possible to deposit much higher thicknesses than in the case of purely mineral coatings.

The required thicknesses can then range from 5 to 150 µm.

Resins of the alkyd type are particularly suitable.

As previously indicated, the temporary outer protective coating can be monolayered or multilayered, in particular di-layered.

The layers can all be mineraly as well as both mineral and organic. In such a case, preferably the organic layer is deposited on the mineral low thickness layer (5 to 200 nm) and can have a much higher thickness, typically from 0.2 to 10 µm.

As previously indicated, the temporary outer protective coating is mechanically alterable through friction and/or contact. Mechanically alterable through friction and/or contact according to the invention means a coating being removed after having been subjected to a dry wiping, consisting in 5 to and fro movements on the wiping area with a Wypall L40® cloth from the KIMBERLY-CLARK corporation, while maintaining a 3 kg/cm² pressure.

The invention is particularly useful for covering brittle temporary outer protective coatings, i.e. which are removed after being subjected to a dry wiping consisting in 5 to and fro movements on the wiping area with the above-mentioned Wypall cloth, while maintaining a 60 g/cm² pressure.

The remaining disclosure refers to FIG. 1 illustrating an ophthalmic lens provided with a temporary outer protective coating and with a peelable electrostatic film according to one embodiment of the invention.

According to the invention, the temporary outer protective coating is coated with a peelable film adhering electrostatically to the coating surface (peelable electrostatic film).

Such peelable electrostatic films are known per se and are flexible films made in a plastic material, preferably in polyvinyl chloride (PVC), with high plasticizer content, i.e. at least 20% by weight, preferably at least 30% by weight and typically ranging from 30 to 60% by weight.

The peelable electrostatic films according to the invention have a thickness generally ranging from 100 to 200 µm, typically in the order of 150 µm.

A PVC peelable electrostatic film (150 µm thick) containing 36% by weight of plasticizer is marketed by JAC corporation under the reference STICK 87015. Another useful film marketed by said corporation is that with reference no 87215.

Such electrostatic films generally have the form of A4 paper sheets, wherefrom the desired portion can be cut out so as to provide the coating protection.

On such a part, a gripping tab can be provided, extending beyond the lens edge in order to facilitate peeling the film.

Surprisingly, it has been found that such protective films can be removed from the lens surface without altering the temporary protective coating despite the high sensitivity thereof to alterations through friction and through contact, and more particularly, a mineral temporary coating, with a thickness equal to or lower than 50 nm, and most particularly, in the case of a $MgF_2$ coating.

Referring to FIG. 1, there is illustrated an ophthalmic lens 1, for example based on CR39® (diethylene glycol bisallyl-carbonate copolymer), having its convex side coated with a hydrophobic and/or an oleophobic coating (for example perfluorinated) and with a temporary outer protective coating (for example a $MgF_2$ layer).

According to the invention, the centre part of the temporary protective coating is coated with an electrostatic peelable film 2 comprising a main part 3 with a circular general shape and a gripping tab 4 extending from the circumference of the centre part 3 beyond the lens 1 edge.

Such a tab 4 allows the peelable film 2 to be easily removed without any risk of alteration of the temporary outer protective coating.

The lens according to the invention can be subjected to a quite conventional edging operation, except that, before the edging operation, the peelable electrostatic film should be removed, and, in a final step, a removal operation of the temporary protecting coating is to be carried out.

The removal step of the temporary protective layer can be carried out either in a liquid medium, or through dry wiping, or also through the sequential implementation of those two means.

The removal step in a liquid medium is preferably carried out by a soapy aqueous solution or by an alcohol such as isopropyl alcohol. An acidic solution can also be used, in particular an orthophosphoric acid solution, at molarities ranging from 0.01 to 1 N.

The acidic solution can also comprise anionic, cationic or amphoteric surfactants The temperature at which the removal step is carried out is variable but generally, it occurs at room temperature.

Removing the temporary protective coating can also be enhanced through a mechanical action, preferably using ultrasounds.

For the removal through dry wiping, preferably a WYPALL 40® cloth will be used, marketed by the Kimberly-Clark Corporation.

After the processing with the liquid medium such as the acidic solution, the dry wiping or the combination of both, the removal step may comprise a cleaning step by means of an aqueous solution with a pH substantially equal to 7.

At the end of the removal step of the temporary protective layer, the lens exhibits optical and surface features of the same order, even nearly identical to those of the initial lens, more particularly comprising the hydrophobic and/or oleophobic coating.

The invention also relates to a method for edging an optical lens, more particularly an ophthalmic one, comprising the steps of:
providing an optical lens such as herein described;
removing the electrostatic peelable film in order to strip off the mechanically alterable outer layer;
depositing the optical lens in a edging device comprising a holding pad, such that the holding pad would adhere to the mechanically alterable outer layer;
edging the optical lens;
removing the temporary protective coating; and
recovering the edged, final optical lens.

EXAMPLE 1

The deposits are carried out on substrates which are CR39® based, ORMA® 15 Supra, ophthalmic glasses, with a −2.00 dioptre power, a 65 mm diameter, comprising, on both sides, an anti-abrasion coating of the polysiloxane type.

1-1 Description of the Substrate Processing

The vacuum treating machine being used is a Balzers BAK760 machine provided with an electron gun, an ion gun of the "End-Hall" Mark 2 Commonwealth type and a Joule effect evaporation source.

The glasses are arranged on a carrousel, with the concave side facing the evaporation sources and the ion gun.

A pumping operation is performed until a secondary vacuum is reached.

The substrate surface is activated irradiating it with an argon ion beam, using the Mark 2 ion gun.

Then, after the ion irradiation has been interrupted, a successive evaporation is performed, with the electron gun, of 4 anti-reflection optical layers, high refractive index (HI), low refractive index (BI), high refractive index (HI), low refractive index (BI): $ZrO_2/SiO_2/ZrO_2/SiO_2$.

A hydrophobic and oleophobic coating layer is deposited through evaporation of a product of the tradename Optool DSX® (compound comprising perfluoropropylene units) sold by DAIKIN corporation.

The thickness of the resulting hydrophobic and oleophobic coating ranges from 2 to 5 nm.

Finally, the temporary outer protective layer is deposited through evaporation.

The deposited material is a compound with $MgF_2$ formula, having a 1 to 2.5 nm grain size, sold by Merck Corporation.

The evaporation is performed using an electron gun.

The deposited physical thickness is 20 nm with a deposit speed of 0.52 nm/s.

Subsequently, the enclosure is heated again and set back to the atmosphere of the treatment chamber.

The glasses are then turned upside down and their convex side oriented towards the treatment area. The convex side is treated identically to the concave side (reproducing the above described steps).

Half of the treated glasses are placed in a bag without any protection.

| | |
|---|---|
| Reference of the lenses | Orma ® 15 Supra, −2.00 dioptre power |
| Diameter | 65 mm |
| Number | 15 glasses |
| Reference of the bags | Landouzy/Papier Fabrik Lahnstein |

1-2 Application of the Electrostatic Films

An electrostatic film with a 38 mm diameter having a tab as illustrated on FIG. 1 is applied manually in the middle of the convex side of the glasses, on the other 15 glasses.

The glasses are then placed in Landouzy/Papier Fabrik Lahnstein bags.

| | |
|---|---|
| Reference of the glasses | Orma ® 15 Supra, −2.00 dioptre |
| Diameter | 65 mm |
| Number | 15 glasses |
| Electrostatic film supplier | Sericom - Plastorex Corporation, JAC manufacturer |
| Material | PVC |
| Film thickness | 150 μm |

1-3 Storage of the Glasses

The 15 glasses with no film and the 15 glasses with an electrostatic film, in the bags, are arranged vertically, in 30 glass rows (standard storage) in cardboard boxes and are stored for 4 months, in a room which is neither regulated in hygrometry nor temperature.

The substrate/bag pressure is approximately 200 grammes.

1-3 Electrostatic Film Removal and Glass Inspection Step

After a 4 month storage period, all the glasses are removed from the bags, and the electrostatic films are <<peeled>> manually tearing on the tab.

The lenses are inspected under a Waldmann lamp. The integrity of the protective layer is visually inspected by reflection.

When the protective layer is intact, its reflection is blue coloured and even on the whole surface.

When the protective layer is altered, its reflection is not even: the defects have a size higher than 1 mm in diameter.

The glasses are then subjected to a edging operation.

Whether the edging operation occurs properly is recorded (no adhesion loss of the holding pad).

| | Glass treated without any electrostatic film | Treated glass + electrostatic film |
|---|---|---|
| Visual inspection by reflection under a Waldmann lamp | The temporary protective layer is partially damaged, even completely erased at the middle of the lens. There has been some transfer of the temporary protective layer in the bag cushion. | After removal of the film, the temporary protective layer is intact (even blue reflections). |
| Adhesion of the holding pad during the edging operation | Bad adhesion of the holding pad | Good adhesion of the holding pad |

EXAMPLE 2

30 polycarbonate glasses, of a −2.00 dioptre power, are treated as described in paragraph 1-1 in example 1.

1-1 Application of the Electrostatic Films and Arrangement in Bags 15 glasses are put into bags without any protection.

| | |
|---|---|
| Reference of the glasses | Polycarbonate, −2.00 dioptre power, diameter 70 mm |
| Number | 15 glasses |
| Bag supplier | Schock/Papier Fabrik Lahnstein Schock |

An electrostatic film of a 38 mm diameter with a tab is applied manually in the middle of the convex side of the glasses on the 15 other remaining glasses.

The glasses are then placed into bags.

| | |
|---|---|
| Reference of the glasses | Polycarbonate, −2.00 dioptre power, diameter 70 mm |
| Number | 15 glasses |
| Electrostatic film supplier | Sericom - Plastorex Corporation, JAC manufacturer |
| Material | PVC |
| Film thickness | 150 μm |

1-2 Test

The objective of this test is to simulate extreme transportation conditions.

Description of the Test:

The glasses, being in bags, are placed on a plate, convex side downwards. The plate 40 is then rapidly (within 16 seconds) moved forty times from left to right and vice versa on a 10 cm path.

Electrostatic Film Removal and Glass Inspection Step

After the test, all the glasses are removed from the bags.

The electrostatic films are peeled manually tearing on the tab.

The glasses are inspected under a Waldmann lamp.

They are subsequently subjected to a edging operation.

|  | Treated glass without electrostatic film | Treated glass + electrostatic film |
|---|---|---|
| Visual inspection by reflection under Waldmann lamp | The temporary protective layer is highly damaged, especially in the convex middle of the glass, due to the friction against the bag cushion. The convex reflection is no longer even. | The temporary protective layer is intact (even blue reflections) |
| Result of the adhesion of the holding pad during the edging operation | Bad adhesion of the holding pad | Good adhesion of the holding pad |

The invention claimed is:

1. An optical lens comprising a concave surface and a convex surface and further comprising:
   (i) a temporary protective coating at least partially covering the convex surface of the lens, said protective coating comprising a mineral outermost layer that is mechanically alterable through friction and/or contact, with the proviso that said outermost layer is not a metal oxide and/or metal hydroxide outermost layer directly in contact with an underlying layer containing magnesium fluoride; and
   (ii) a peelable film electrostatically adhering to said outermost layer of the temporary protective coating,
   wherein the peelable film at least covers the central part of the convex surface of the lens and has been applied by depositing a preformed film onto the temporary protective coating,
   wherein the temporary protective coating covers at least 15% of the convex surface of the lens, and is on a hydrophobic surface coating, an oleophobic surface coating, or a surface coating that is both hydrophobic and oleophobic.

2. The lens of claim 1, wherein the outermost layer of the temporary protective coating comprises at least one metal fluoride, metal oxide, or metal hydroxide.

3. The lens of claim 2, wherein the outermost layer of the temporary protective coating comprises at least one of $MgF_2$, $LaF_3$, $AlF_3$, $CeF_3$, $MgO$, $CaO$, $TiO_2$, $Al_2O_3$, $ZrO_2$, $Pr_2O_3$, $Mg(OH)_2$, $Ca(OH)_2$, or $Al(OH)_3$.

4. The lens of claim 3, wherein the metal fluoride is $MgF_2$.

5. The lens of claim 3, wherein the metal oxide is MgO.

6. The lens of claim 3, wherein the metal hydroxide is $Mg(OH)_2$.

7. The lens of claim 2, wherein the outermost layer of the temporary protective coating is made of a metal fluoride.

8. The lens of claim 7, wherein the metal fluoride is $MgF_2$.

9. The lens of claim 1, wherein the temporary protective coating is mineral and has a thickness equal to or lower than 50 nm.

10. The lens of claim 1, wherein the outermost layer of the temporary protective coating has a surface energy of at least 15 mJ/m2.

11. The lens of claim 1, wherein the temporary protective coating covers the whole surface of the lens.

12. The lens of claim 1, wherein the temporary protective coating is a multilayered coating.

13. The lens of claim 1, wherein the temporary protective coating has been deposited via a vapor phase deposition.

14. The lens of claim 1, wherein the electrostatic peelable film is a flexible film made of a plastic material containing at least 20% by weight of at least one plasticizer.

15. The lens of claim 14, wherein the plastic material film contains at least 30% by weight of at least one plasticizer.

16. The lens of claim 14, wherein the plastic material flexible film is a polyvinyl chloride (PVC) film.

17. The lens of claim 1, wherein the electrostatic film has a thickness ranging from 100 to 200 µm.

18. The lens of claim 1, wherein the hydrophobic and/or oleophobic surface coating has a surface energy equal to or lower than 14 $mJ/m^2$.

19. The lens of claim 18, wherein the hydrophobic and/or oleophobic surface coating has a surface energy equal to or lower than 12 $mJ/m^2$.

20. The lens of claim 19, wherein the hydrophobic and/or oleophobic surface coating has a thickness lower than 10 nm.

21. The lens of claim 20, wherein the hydrophobic and/or oleophobic surface coating has a thickness lower than 5 nm.

22. The lens of claim 1, wherein the hydrophobic and/or oleophobic surface coating is on a lens anti-reflection coating.

23. A method for edging an optical lens, comprising:
   providing an optical lens according to claim 1;
   removing the electrostatic peelable film;
   depositing the optical lens in an edging device comprising a holding pad, such that the holding pad would adhere to the mechanically alterable outer layer;
   edging the optical lens;
   removing the temporary protective coating; and
   recovering an edged optical lens.

24. An optical lens comprising a concave surface and a convex surface and further comprising:
   (i) a temporary protective coating at least partially covering the convex surface of the lens, said protective coating comprising an outermost layer that is mechanically alterable through friction and/or contact and comprises at least one metal fluoride, with the proviso that said outermost layer is not a metal oxide and/or metal hydroxide outermost layer directly in contact with an underlying layer containing magnesium fluoride; and
   (ii) a peelable film electrostatically adhering to said outermost layer of the temporary protective coating,
   wherein the peelable film at least covers the central part of the convex surface of the lens and has been applied by depositing a preformed film onto the temporary protective coating, and
   wherein the temporary protective coating is on a hydrophobic surface coating, oleophobic surface coating, or a surface coating that is both hydrophobic and oleophobic.

25. The lens of claim 24, wherein the outermost layer of the temporary protective coating comprises at least one of $MgF_2$, $LaF_3$, $AlF_3$, and $CeF_3$.

* * * * *

UNITED STATES PATENT AND TRADEMARK OFFICE
CERTIFICATE OF CORRECTION

PATENT NO. : 8,679,637 B2  
APPLICATION NO. : 10/573692  
DATED : March 25, 2014  
INVENTOR(S) : Lacan et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 784 days.

Signed and Sealed this  
Twenty-ninth Day of March, 2016

Michelle K. Lee  
*Director of the United States Patent and Trademark Office*